United States Patent [19]

LeFebre

[11] Patent Number: 4,664,522
[45] Date of Patent: May 12, 1987

[54] OPTICAL WAVEGUIDE SPECTRUM ANALYZER AND METHOD

[75] Inventor: David A. LeFebre, Rancho Cordova, Calif.

[73] Assignee: Guided Wave, Inc., El Dorado Hills, Calif.

[21] Appl. No.: 644,325

[22] Filed: Aug. 24, 1984

[51] Int. Cl.$^4$ .......................... G01J 3/18; G01J 3/36
[52] U.S. Cl. .................................... 356/328; 356/334
[58] Field of Search ................ 356/326, 328, 332, 334

[56] References Cited

U.S. PATENT DOCUMENTS

| 4,012,147 | 3/1977 | Walrafen | 356/326 |
| 4,469,441 | 9/1984 | Bernier et al. | 356/334 X |
| 4,560,276 | 12/1985 | Yoshioka | 356/334 |

FOREIGN PATENT DOCUMENTS 109536  5/1984  European Pat. Off. ............ 356/328

OTHER PUBLICATIONS

LaSalle & Platz, "A Compact, Concave Grating, Two Detector, Spectrum Analyzer for the Measurement of Electron Temperatures in Ctr Plasmas by Ruby Laser Scattering", *Optics Communications*, vol. 17, #3, Jun. 1976, pp. 325-7.

Angus "A Scanning Spectrophotometer; Design and Applications" Optical Spectra (Aug. 1980), pp. 49-52.

Primary Examiner—Vincent P. McGraw

[57] ABSTRACT

System and method for analyzing spectral data from an optical fiber waveguide. Light from the waveguide is directed to a diffraction grating which separates the light into its spectral components and directs these components toward a light responsive detector. The grating is rotated to cause spectral components of different wavelengths to sweep across the detector, and a sensor provides a signal corresponding to the angular position of the grating. A table of calibration data is generated by introducing monochromatic light of known wavelength into the waveguide, positioning the grating to cause the light at two known points in the spectrum of the monochromatic light to impinge upon the detector, and utilizing the wavelength of the monochromatic light and the values of the sensor signal at the two known points to define the relationship between the sensor signal and the detected wavelength for a plurality of grating positions. The calibaration data and the sensor signal are utilized to determine the wavelength of light peaks produced by a sample, and they are also utilized to generate a control signal for positioning the grating very accurately to detect light of a given wavelength. In one disclosed embodiment, two detectors having different spectral responses are employed, and light in different portions of the spectrum is detected by respective ones of the detectors.

12 Claims, 8 Drawing Figures

FIG. 5.
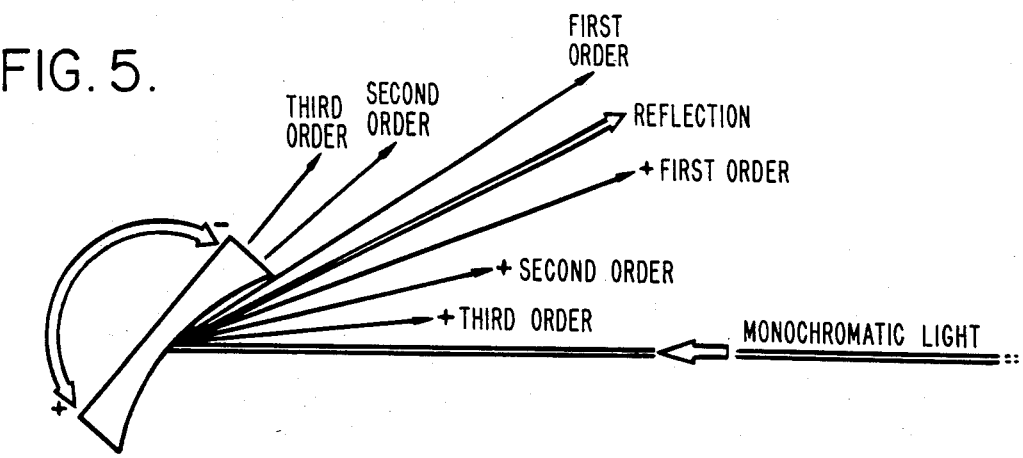
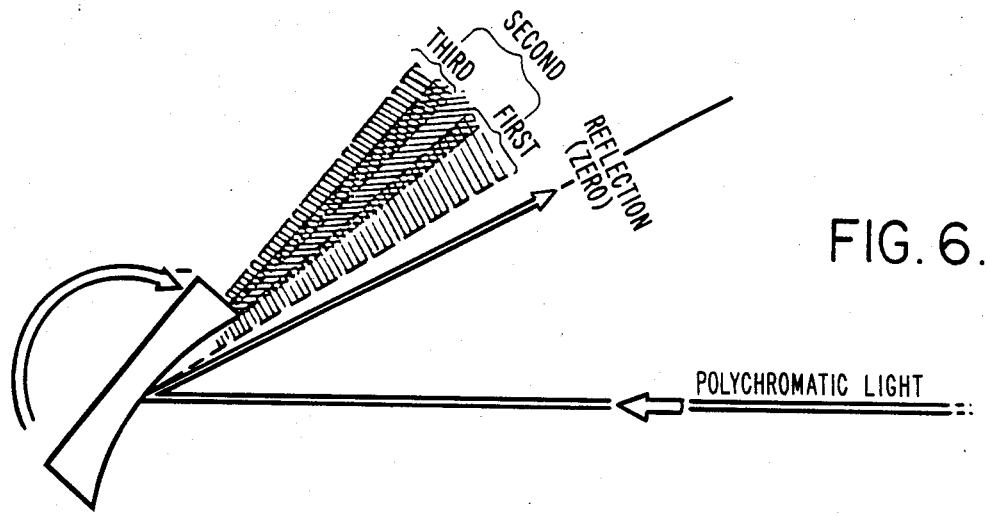
FIG. 6.
FIG. 7.
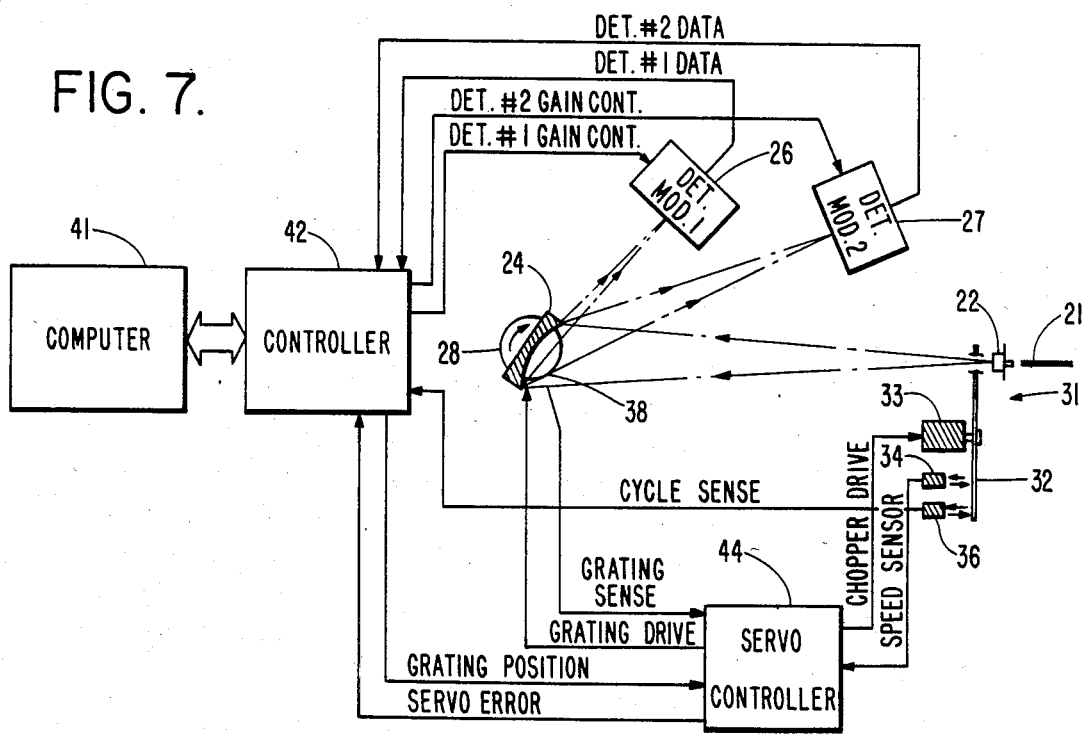

OPTICAL WAVEGUIDE SPECTRUM ANALYZER AND METHOD

This invention pertains generally to spectral analysis, and more particularly to a spectrum analyzer and method for analyzing spectral data from samples at remote locations.

Many spectrum analyzers in use today require all samples to be brought to the instruments themselves for analysis. Such instruments cannot be utilized satisfactorily where the sample cannot be brought to the instrument or where the sampling rates or volumes are too high or where the materials to be sampled are in hazardous or sterile environments.

Heretofore, there have been some attempts to utilize optical waveguides to bring spectral data from remote locations to the analyzing instruments. The accuracy and repeatability of results obtained with such systems are dependent to a large extent upon the coupling between the optical fiber and the input port of the instrument, and this coupling varies with factors such as the position of the fiber in the port and the angle at which the end of the fiber is cut.

These attempts relied on optical waveguide bundles which had large optical gross sections similar to the beam diameter of a conventional spectrophotometer. Large optical waveguide bundles are costly, difficult if not impossible to image due to light traveling in the cladding, extremely inefficient to multiplex, more mechanically dependent on failure than single strand optical waveguides, dependent on spatial orientation of individual strands at the distal end for best performance, and prone to ambient light pickup at the distal end.

One problem in sensing remote spectra of absorbance or reflectance using optical waveguides lies in coping with ratided spectra which in themselves do not have flat base lines. That is, to measure absorbance or reflectance of a sample, first a reference must be taken. The reference is inclusive of all the elements in the system except the sample. Conventional spectrophotometers rely on a flat base line—intensity or throughput with wavelength is close to a straight line. However, with optical waveguides inserted into the system the base line is no longer flat but has absorbance peaks, i.e. —OH overtones and Rayleigh scattering (Loss $\alpha 1/\lambda^4$). With the measurement of the sample the problem may be compounded. Extraction of the sample only spectra requires that the reference spectra be ratioed to that of the sample spectra which includes the sample and reference spectra. To do the ratio accurately requires extremely high wavelength repeatability. The ratio is taken on each wavelength point measured. Any deviation in wavelength can cause a large error in the resultant measurement.

It is in general an object of the present invention to provide a new and improved spectrum analyzer and method for use with optical waveguides carrying spectral data from remote locations.

Another object of the invention is to provide a spectrum analyzer and method of the above character which overcome the foregoing and other problems heretofore encountered with spectrum analyzers coupled to optical waveguides. Another object of the invention is to provide a spectrum analyzer and method of the above character which are easy to use and highly accurate in a variety of applications.

These and other objects are achieved in accordance with the invention by directing light from an optical waveguide to a diffraction grating which separates the light into its spectral components and directs these components toward a light responsive detector. The grating is rotated to cause spectral components of different wavelengths to sweep across the detector, and a sensor provides a signal corresponding to the angular position of the grating. A table of calibration data is generated by introducing monochromatic light of known wavelength into the waveguide, positioning the grating to cause the light at two known points in the spectrum of the monochromatic light to impinge upon the detector, and utilizing the wavelength of the monochromatic light and the values of the sensor signal at the two known points to define the relationship between the sensor signal and the detected wavelength for a plurality of grating positions. The calibration data and the sensor signal are utilized to determine the wavelength of light modified by a sample, and they are also utilized to generate a control signal for positioning the grating very accurately to detect light of a given wavelength. In one disclosed embodiment, two detectors having different spectral responses are employed, and light in different portions of the spectrum is detected by respective ones of the detectors.

FIG. 5 illustrates the diffraction of monochromatic light by the grating in the embodiment of FIG. 1.

FIG. 6 illustrates the diffraction of polychromatic light by the grating in the embodiment of FIG. 1.

FIG. 7 is a block diagram of a portion of the spectrum analyzer illustrated in FIG. 1.

Figure 1:
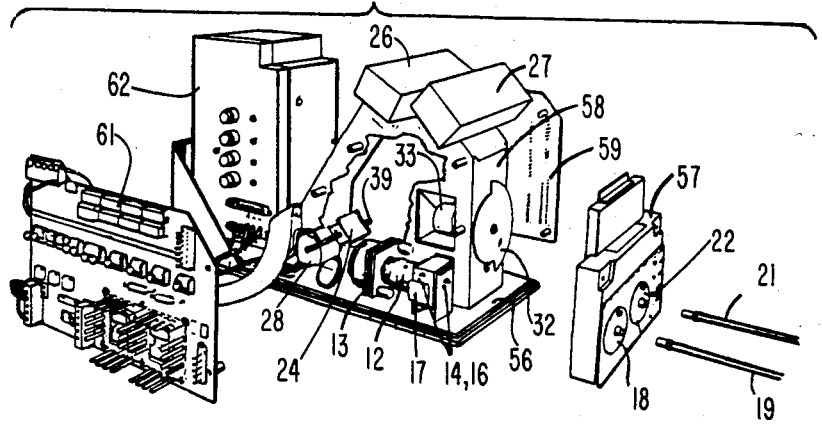
FIG. 1 is an exploded perspective view of one embodiment of a spectrum analyzer according to the invention, with the housing or cover of the instrument removed for convenience of illustration.
Figure 2:
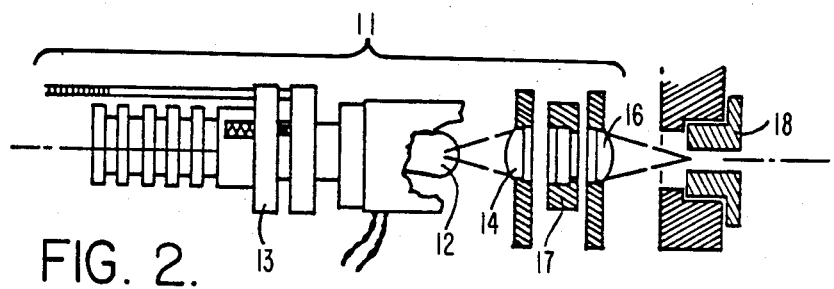
FIG. 2 is a cross-sectional view, somewhat schematic, of the light source in the embodiment of FIG. 1.
Figure 3:
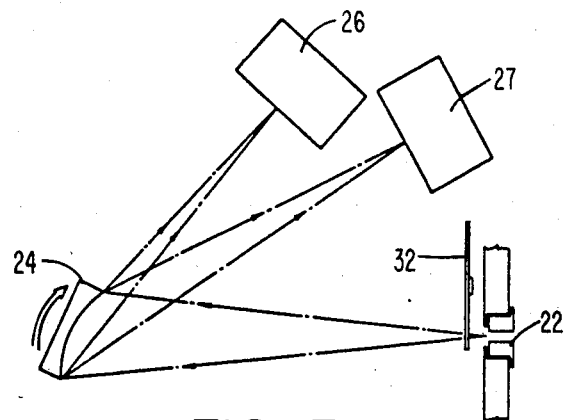
FIG. 3 is a schematic illustration of the monochromator or light detecting system in the embodiment of FIG. 1.

As illustrated in the drawings, the spectrum analyzer includes a light source 11 comprising a lamp 12 mounted in an adjustable holder 13. Focusing lenses 14, 16 are mounted in front of the lamp, and a filter holder 17 is positioned between the lenses. The light source provides light for spectrophotometric applications and for use in calibrating the instrument. The lamp can be of any suitable type such as a tungsten-halogen lamp or a deuterium lamp, and the lenses can likewise be of any suitable type. In one presently preferred embodiment, the lenses are fabricated of fused silica or quartz, and they are mounted back-to-back to reduce variation in focusing at different wavelengths.

Light from the source is directed to an adapter port 18 to which an optical fiber waveguide 19 is connected. The waveguide carries light from the source to a sample located remotely from the instrument itself, and it can be of any desired length up to about 100 meters or more. The waveguide can comprise either a single optical fiber or a plurality of optical fibers arranged in a bundle.

A second optical waveguide 21 carries light from the sample to the instrument, and this waveguide is connected to an entrance port adapter 22 on the instrument. Waveguide 21 can be similar in structure to waveguide 19, or it can be of any other suitable configuration.

Light from waveguide 21 impinges upon a grating 24 which diffracts the light at different angles according to its spectral content. The diffracted light is directed toward a pair of detectors 26, 27 which provide output signals corresponding to the intensity of light impinging thereon. The grating is mounted for rotation about an axis, and a drive motor 28 is connected to the grating to rotate the grating and thus sweep the dispersed light across the detectors. The grating, the detectors and the drive system for the grating are sometimes referred to collectively as a monochromator.

The grating can rotate freely about this axis. There are no mechanical stops to impede the rotation or to cause decelerations which may jar the grating or sensor out of alignment, a major problem of mechanically linked spectrophotometers.

Figure 4:
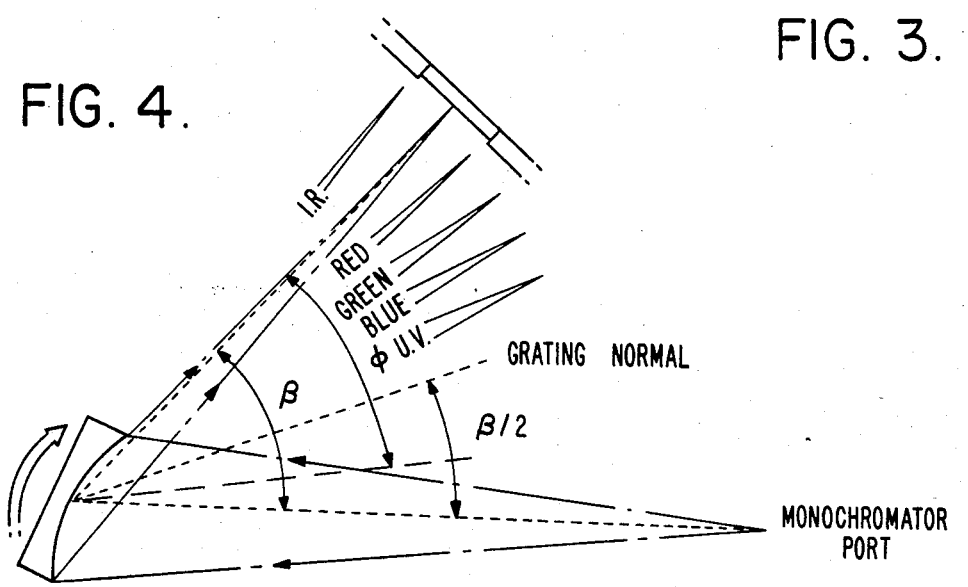
FIG. 4 illustrates the relationship between the entrance port, the grating, the detector and the diffraction of light in a system of the type illustrated in FIG. 1.

Grating 24 is a concave holographic grating having a spherical diffraction surface with a plurality of rulings or grooves thereon. This grating refocuses the incoming divergent beam from the monochromator entrance port onto the detectors to provide a high optical throughput. The grating is blazed to optimize the contours of the ruling profile for dispersing light into the first order and to increase the amount of dispersed light on the detectors. The blaze can also improve diffraction within a specific spectral range within the first order. The angular deviation of the diffracted light is dependent upon the spacing between the rulings or grooves, the exact angle of diffraction being dependent upon the wavelength of the light being diffracted and the number of rulings per unit length. More specifically, referring to FIG. 4, the relationship between the angle of dispersion, the wavelength of the light and the groove density of the grating is given by the following equation:

$$\sin \phi = \frac{Kn\lambda}{2 \cos \beta/2},$$

where $\phi$ is the angle of dispersion relative to the zero order, K is the order of the dispersion and is 1, n is the grating density, $\gamma$ is the wavelength of the dispersed light, and $\beta$ is the fixed angle formed between the entrance port, the grating and the detector. From this relationship, it can be seen that the angular deviation of the diffracted light increases as the rulings are spaced more closely together. In one presently preferred embodiment, the grating has a density of 1,200 rulings per millimeter.

FIGS. 5 and 6 illustrate the manner in which monochromatic light and polychromatic light are diffracted by the grating. For a single monochromatic ray striking the grating surface, the light is diffracted at several different angles. The diffracted light constructively and destructively interferes with itself, with the constructive light interfering rays being diffracted at angles dependent upon the wavelength of the light with a grating of given ruling density. Since the angles at which constructive interference patterns are produced by the grating depend upon the lengths of the waves being diffracted, the waves of various lengths in a beam of polychromatic light striking the grating will be separated into a number of spectra in various orders of interference on either side of an undeviated central image. The central image is referred to as the zero order of interference, and it is a reflected spectra which does not disperse the light. The first order is the least deviated of the remaining orders, and it retains the most energy from the incoming beam under normal circumstances. It also exposes the incoming divergent beam to the largest grating cross-section for maximum energy at the detector. The second order is normally about 10% of the first order, and the third order is approximately 1% of the first order.

A separate exit slit (not shown) is provided for each of the detectors. The slits are positioned immediately in front of the detectors, and the slit locations are chosen to reduce the spectrally dependent aberrations of the grating for the mid range and the low range of the grating span.

The size of the entrance slit is determined by the diameter of the core of the optical waveguide. For precise measurements the cladding annulus is "stopped" by aperture approaching the core diameter.

The two detectors 26, 27 are utilized for detecting light of different wavelengths, and they are selected for optimum performance in the portions of the spectrum or grating span in which they are to be operational. The two detectors provide a substantially wider range of light detection than would be possible with a single detector, and the two detectors provide continuous scans of spectral regions which are not possible with a single detector. For example, a photo-multiplier tube (PMT) and a silicon detector might provide a total spectral range of 170–1,000 nm, with the photo-multiplier tube covering 170–300 nm and the silicon detector covering 300–1,000 nm. Likewise, a silicon detector and a germanium detector might cover a range of 300–2,000 nm, with the silicon detector covering 300–1,000 nm and the germanium detector covering 1,000–2,000 nm. Compensation for varying intensities in the output levels of the detectors is provided by passing the output signals through amplifiers of variable gain.

A light chopper 31 is positioned between entrance port 22 and diffraction grating 24. The chopper comprises a disk 32 driven by a motor 33 to block the incoming light for one-half of each cycle or revolution of the chopper disk. During the dark portion of the cycle, electrically induced offsets are measured by the detectors and the circuitry which processes the detector signals, and these offset signals are subtracted from the detector signals during the light portion of the cycle. The rotational speed of the disk is monitored by a photoelectric sensor 34 and regulated by a phase locked loop. A second photoelectric sensor 36 monitors the outer periphery of the disk to determine whether the disk is in the light portion or the dark portion of its cycle.

It is customary to place the light chopper on the source side in a conventional spectrophotometer and in combination with the detection circuitry reject ambient light. However, in that the source may be external, i.e., a laser or other incoherent source, the chopper was placed next to the input port. Ambient light does not cause a problem due to the design of the distal end of the probe with rejection of 6 decades or more of ambient light.

A sensor 38 coupled to grating 24 provides a signal corresponding to the angular position of the grating. The sensor comprises a highly linear potentiometer, and the signal produced by this sensor bears a very precise linear relationship to the position of the grating. In the presently preferred embodiment, the sensor comprises a laser trimmed conductive plastic potentiometer connected directly to the shaft 39 on which the grating is mounted. In this embodiment, the grating is mounted directly on the output shaft of drive motor 28. Reference voltages $+V_{REF}$ and $-V_{REF}$ are applied to the two end terminals of the potentiometer, and the output signal at the wiper or movable contact is a voltage between these two levels, depending upon the angular position of the grating.

The application of $+V_{REF}$ and $-V_{REF}$ and a gain of greater than 1 for amplifier 48 allows for segmenting of the angular range of the potientiometer or allows positioning accuracies much higher than if the entire range were used. As an example, with a unipolar 1 gigabit D/A converter (0-10 V range), $\pm V_{REF}=10$ V and gain amplifier 48 set at a gain of 3, a segment of 60° is divided into 16 bits of resolution or a subdivision of 0.00092 degrees (3.3 arc sec).

This resolution exceeds an 18 bit full circle optical encoder. Although potentiometers have been used in the art for position sensors, none have been employed previously to such high positional accuracies nor have potentiometers been applied to high resolution spectrophotometers or radiometers.

Mechanical compliance of the motor shaft, grating support and potentiometer shaft are sufficiently small as to not cause a problem and are less than 3 arc seconds.

The nonlinearities of the potentometer are removed through laser trimming the cross sectional area of the potentiometer. Multiple wiper fingers are used to remove localized high resistance nodes of the conductive plastic track.

The spectrum analyzer is utilized in conjunction with a computer 41, and a controller 42 provides the necessary interfacing between the computer and the remainder of the system. The computer can be a microprocessor of known design such as an IBM Model PC. Data from detectors 26, 27 is processed and analyzed by the computer, and this data can be displayed graphically or in any other form desired. The computer also controls the reading of signals from the two detectors to effect scanning of the spectral light components swept across the detectors.

The analyzer is calibrated by means of look-up tables stored in the computer memory, with one such table being provided for each of the two detectors. Each table is generated by applying light of known wavelength to waveguide 21 and noting the values of signals produced by sensor 38 when light at two known points in the resulting spectrum is received by the detector. Utilizing these values and the known wavelength of the light, the known relationship between the sensor signal and the detected wavelength is calculated for the entire spectral range to be analyzed. In one presently preferred embodiment, the range is divided into 1,000 steps, with each step representing an integral wavelength value and a corresponding grating position.

In the calibration process, monochromatic or narrow band polychromatic light is obtained from light source 11 by placing an appropriate filter in holder 17. This light is then coupled from waveguide 19 to waveguide 21 and thus input to the monochromator. The computer scans the approximate areas where the zero order and first order interference peaks should be located, and when the peaks are found, the values of the grating position sensor signal at these points is noted. A grating constant (K) is then calculated according to the following relationship $$K = \frac{\sin(\alpha_1 - \alpha_0)}{\lambda_m},$$

where $\alpha_0$ is the value of the sensor signal at the zero order peak, $\alpha_1$ is the value of the sensor signal at the first order peak, and $\lambda_m$ is the wavelength of the monochromatic light at the first order point. Once the grating constant has been determined, the table of calibration data is generated according to the following relationship $$\alpha = \sin^{-1}(K\lambda),$$

where $\lambda$ is the wavelength of light impinging upon the detector, and $\alpha$ is the expected value of the sensor signal for each impinging wavelength.

Once the calibration tables have been generated, the wavelength of light impinging upon the detectors is known from the signal produced by sensor 38 for any wavelength within the range of the system. The accuracy of the table is somewhat dependent upon the linearity of sensor 38, and for this reason it is important that the potentiometer be as linear as possible. The laser trimmed conductive plastic potentiometer provides a resolution of 0.016° (60 arc sec) and repeats to 3 arc sec under constant conditions. For a 1,200 line/mm grating, this corresponds to a wavelength accuracy of $\pm 0.5$ nm limited to the 1000 point look up table and a wavelength repeatability of less than $\pm 0.02$ nm.

Once the calibration table has been set up, it remains valid until the system is disturbed, for example by changing detectors or repositioning waveguide 21 at entrance port 22. The system should also be recalibrated if the grating is changed or if the instrument is moved, dropped or exposed to significant temperature changes. The calibration process compensates for variations in slit location, detector location, waveguide location and fiber end orthogonality. It will also compensate for some structural distortion caused by physical abuse of the instrument. The grating constant K corrects for electrical offsets and slight scale factor changes of the electronics as well.

Figure 8:
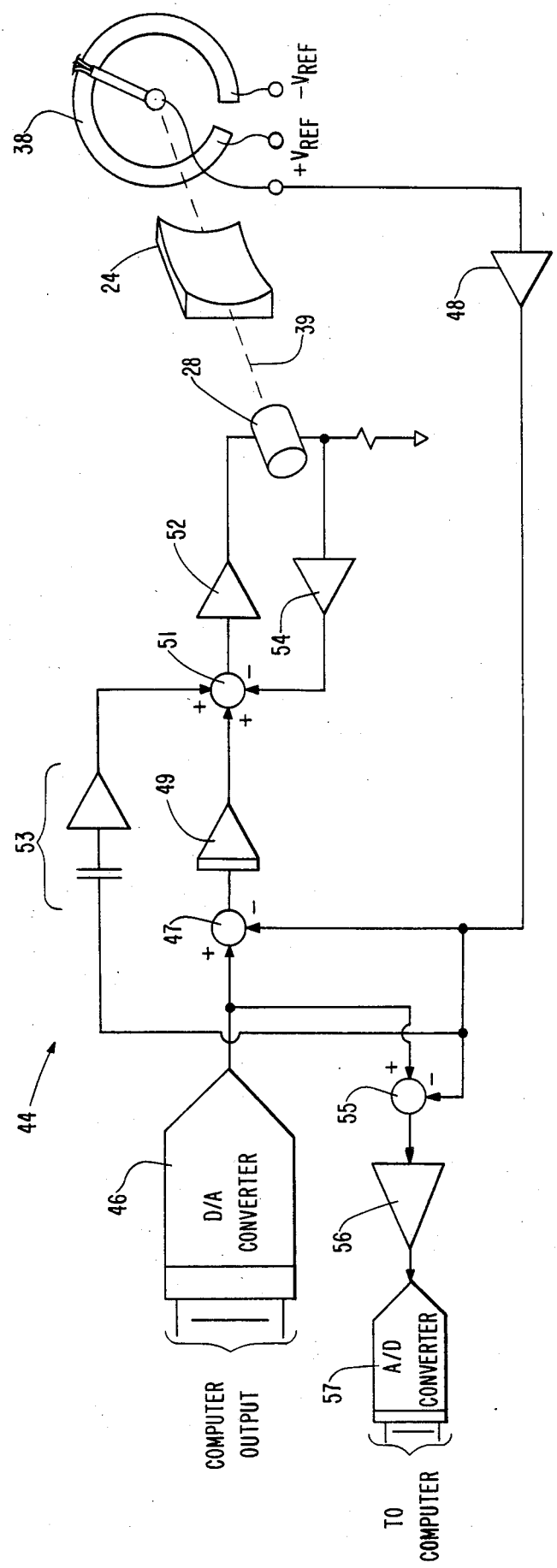
FIG. 8 is a block diagram of one embodiment of a servo motor system for controlling the position of the grating in the embodiment of FIG. 1.

The calibration data and the signal from sensor 38 are also utilized to position the grating so that light of a desired wavelength will fall on detectors 26, 27. As illustrated in FIG. 8, the operation of drive motor 28 is controlled by a servo system 44 to which the sensor signal and the calibration data are applied. The calibration data is stored in digital form in the computer, and it is converted to analog form by a digital-to-analog converter 46. The output of converter 46 is connected to one input of a summation network 47, and the signal from sensor 38 is amplified by an amplifier 48 and applied to a second input of the summation network. In the summation network, the sensor signal is subtracted from the calibration data signal to provide an error signal which is applied to the input of an integrator 49.

The output of integrator 49 is connected to one input of a second summation network 51, and the output of this network is connected to the input of an amplifier 52. The output of amplifier 52 is connected to drive motor 28 to control the operation of the motor. A feed forward rate loop 53 is provided between the output of the sensor 38 and a second input of summation network 51 for purposes of damping, and a current feed back amplifier 54 is connected between drive motor 28 and a third input of network 51. This network combines the signals from integrator 49 and loop 53 in an additive manner, and the feed back signal from amplifier 54 is subtracted from the other signals.

In operation, the value of the grating position signal found in the calibration table for a desired wavelength is compared with the value of the signal produced by the sensor. If these two values are not the same, an error signal is generated and the position of the grating is adjusted in accordance with this signal.

Additional nonlinear elements (diodes) are incorporated around integrator 49 to provide capture in the 60 degree arc of operation.

An additional feature of this servo positioning system is the ability to remove the positioning error of the servo from the actual position. For fast scanning finite positional error or lag occurs. Summing junction 55 looks at the difference signal from the command D/A converter output 46 and compares it to amplifier output 48, the sensor position. By using a high gain amplifier 56 which in turn feeds an A/D converter 57, instantaneous positional error may be sensed and corrected for by the computer. Variations of 0.1 arc seconds or less can be sensed.

In the embodiment illustrated in FIG. 1, all of the components of the spectrum analyzer other than the computer are housed in a single cabinet. This cabinet includes a base 56, and a removable cover (not shown). The components of light source 11 are mounted along one side of the base, and waveguide port adapters 18, 22 are mounted on a panel 57 which is affixed to the base and projects through an opening in the front panel of the cabinet. The components of light chopper 31 and the monochromator are mounted on a frame 58 in a central position on base 56. A circuit board 59 for controller/interface 42 is mounted in a vertical position on one side of the base, and the servo control system 44 is mounted on a circuit board 61 on the other side of the base. A power supply 62 for the system is mounted on the base to the rear of the monochromator.

The spectrum analyzer can be utilized for any of the common spectral analyses such as absorbance, reflectance, fluorescence and scattering. Light source 11 provides a polychromatic source of radiation for absorbance and reflectance and a black-body radiation source for spectroradiometry. Suitable probes (not shown) are connected to the distal ends of waveguides 19, 21 in accordance with the type of analysis to be made.

The invention has a number of important features and advantages. It provides accurate and repeatable analyses of spectral data from samples which cannot be brought to the instrument itself, and it overcomes the problems previously encountered in processing spectral data from optical waveguides. The system is highly accurate and easy to use, and the interchangeability of components such as the detectors and the diffraction grating enable the system to be utilized in a wide variety of applications. The use of a conductive plastic laser trimmed potentiometer of less than a 2 inch diameter provides a compact, accurate and reliable means of positioning the grating not found in any other design reported.

It is apparent from the foregoing that a new and improved spectrum analyzer and method have been provided. While only one presently preferred embodiment has been described in detail, as will be apparent to those familiar with the art, certain changes and modifications can be made without departing from the scope of the invention as defined by the following claims.

What is claimed is:

1. In a spectrum analyzer for use with an optical waveguide which carries spectral data in the form of light modified from sample: a detector responsive to light impinging thereon for providing an output signal, a diffraction grating which receives light from the waveguide and produces a plurality of angularly displaced light intensity changes corresponding to the spectral content of the light, a drive motor connected to the grating for rotating the grating about an axis to direct light peaks of different wavelengths toward the detector, rotary conductive plastic potentiometer means for providing an output signal which varies substantially linearly with respect to angular position throughout 360 degrees, said potentiometer means, said motor, and said grating being mounted on a single shaft which is free to rotate through 360 degrees, a table of calibration data containing the values of potentiometer output signals for which light intensities of different wavelengths are directed to the detector, and means responsive to the potentiometer output signals and the calibration data for determining the wavelength of light impinging upon the detector.

2. The spectrum analyzer of claim 1 including control means connected to the drive motor and responsive to the potentiometer output signal and the calibration data for actuating the motor to rotate the grating to direct light of a predetermined wavelength toward the detector.

3. The spectrum analyzer of claim 2 wherein the control means comprises means for combining the potentiometer output signal and the calibration data to provide an error signal, means for integrating the error signal, and servo amplifier means responsive to the integrated error signal for applying a control signal to the drive motor.

4. The spectrum analyzer of claim 1 including a second detector displaced from the first-named detector and responsive to light of different wavelength than the first-named detector.

5. The spectrum analyzer of claim 1 including means for introducing monochromatic or narrow band polychromatic light of known wavelength into the waveguide, and means responsive to the signal produced by the potentiometer at two known points in the spectrum of the monochromatic light for generating the table of calibration data.

6. The spectrum analyzer of claim 1 including a light source and a single strand optical waveguide for directing light from the source to the sample.

7. In a spectrum analyzer: a light source, a first single strand optical waveguide means for applying light from said light source to a remote sample, a second single strand optical waveguide means for carrying spectral data in the form of light from a sample, a detector responsive to light impinging thereon for providing an output signal, a diffraction grating which receives light from said second waveguide means and produces a plurality of angularly displaced light intensities corresponding to the spectral content of the light, a drive motor connected to the grating for rotating the grating about an axis to direct light peaks of different wavelengths toward the detector, rotary conductive plastic potentiometer means for providing an output signal which varies substantially linearly with respect to angular position throughout 360 degrees, said potentiometer means, said motor, and said grating being mounted on a single shaft which is free to rotate through 360 degrees, a table of calibration data containing the values of potentiometer output signals for which light peaks of different wavelengths are directed to the detector, and control means connected to the drive motor and responsive to the potentiometer output signal and the calibration data for actuating the motor to rotate the grating to direct light of a predetermined wavelength toward the detector.

8. The spectrum analyzer of claim 7 wherein the potentiometer means comprises a laser trimmed conductive plastic potentiometer.

9. The spectrum analyzer of claim 7 wherein the control means comprises means for combining the potentiometer output signal and the calibration data to provide an error signal, means for integrating the error signal, and servo amplifier means responsive to the integrated error signal for applying a control signal to the drive motor.

10. The spectrum analyzer of claim 7 including a second detector displaced from the first-named detector and responsive to light of different wavelength than the first-named detector.

11. The spectrum analyzer of claim 7 including means for introducing a monochromatic light of known wavelength into the waveguide, and means responsive to the signal produced by the potentiometer at two known points in the spectrum of the monochromatic light for generating the table of calibration data.

12. In a method of analyzing spectral data utilizing an instrument having a single strand optical waveguide which carries light from a sample located remotely of the instrument, a light responsive detector, a diffraction grating which receives light from the waveguide and produces a plurality of angularly displaced light intensities corresponding to the spectral content of the light, a drive motor which rotates the grating to direct light intensities of different wavelengths toward the detector, and a sensor which produces a potentiometer output signal corresponding to the position of the grating, said sensor comprising a rotary conductive plastic potentiometer means for producing an output signal which varies substantially linearly throughout 360 degrees, with said sensor, said motor, and said grating being mounted on a single shaft and being free to rotate through 360 degrees, the steps of: introducing monochromatic light into the single strand waveguide, positioning the grating to cause light at the zero order peak and the first order peak in the spectrum of the monochromatic light to impinge upon the detector, determining the grating content (K) for the instrument according to the relationship $$K = \frac{\sin(\alpha_1 - \alpha_0)}{\lambda_m},$$

where $\alpha_0$ is the value of the sensor signal at the zero order peak, $\alpha_1$ is the value of the sensor signal at the first order peak, and $\lambda_m$ is the first order wavelength of the monochromatic light, and setting up a table of calibration data for the instrument according to the relationship $$\alpha = \sin^{-1}(K\lambda),$$

where $\lambda$ is the wavelength of light impinging upon the detector and $\alpha$ is the value of the sensor signal corresponding to each impinging wavelength;

said grating positioning step being accomplished solely by electrical energizing of said motor by signals derived from said potentiometer operative throughout the 360 degrees of rotation of said shaft.

* * * * *